UNITED STATES PATENT OFFICE.

PETER DIEDRICH HINRICH OHLHAVER, OF SANDE, GERMANY.

PROCESS OF INCREASING THE RAISING POWER OF DRIED YEAST.

1,021,700.      Specification of Letters Patent.      Patented Mar. 26, 1912.

No Drawing.      Application filed August 24, 1911. Serial No. 645,828.

*To all whom it may concern:*

Be it known that I, PETER DIEDRICH HINRICH OHLHAVER, a subject of the Emperor of Germany, residing at Sande, Germany, have invented certain new and useful Improvements in Processes of Increasing the Raising Power of Dried Yeast, of which the following is a specification.

This invention relates to a process of treating dried yeast with moisture laden air prior to using it, and has for its object to increase the raising and fermenting power of the dried yeast to its maximum amount.

Fresh yeast can be dried without injuring the activity of the yeast organisms by observing certain precautions and the active properties of the yeast can be preserved in the dried state for a considerable time. There is however a drawback to this state in that the raising power of the yeast is inversely proportional to the amount of drying which it undergoes, and with progressive drying therefore a diminishing degree of raising and fermenting power is forthcoming. By the present invention the lost raising and fermenting power of the dry yeast is restored to its original strength, or it may even be increased beyond its original strength.

The organisms of the yeast are albuminous bodies which can only develop their full activity when in a hydrated condition that is to say, when molecules of water are combined with them. During the drying process and particularly during an intense or prolonged drying process not only is the water within the yeast cell evaporated, but the water molecules are also withdrawn from the hydrated organisms of the yeast by which the activity of such organisms is correspondingly paralyzed. In order to restore to the organisms of the dry yeast their full strength, an opportunity must be afforded to the dry yeast to re-attach to its organisms the molecules of water which have been taken away by drying. This is accomplished by exposing the dry yeast in thin layers to contact with air; by this means the vaporous moisture usually present in the air attaches itself to the organisms of the dry yeast and they thus regain their original activity. The time required in which to hydrate these organisms depends essentially on the degree of humidity of the air. For example, 10 grams of a dry yeast had a raising power of 2240 ccm. In order to preserve the life of this dry yeast for a still longer time it was further dried and in so doing its raising power was reduced to 1160 ccm. This same much-dried yeast was then exposed for about 43 hours in thin layers to access of atmospheric air prior to using it, and by so doing its raising power was increased to no less than 2670 ccm.

In order to render the process independent of the fluctuations which would occur owing to the varying amounts of humidity in atmospheric air, the air used may advantageously be saturated with moisture artificially. The full raising power of the yeast can thus be imparted to it in a much shorter time. For instance if the dry yeast is placed in a closed receptacle along with a damp cloth, but out of contact with same, the air in the receptacle will quickly become saturated by reason of its taking up the moisture from the cloth and the absorption of water by the yeast organisms will be accomplished in a correspondingly shorter time.

The advantageous absorption of the vaporous moisture by the yeast appears to be due to a process of respiration which is set up. Neither putting the yeast in direct contact with water, or dissolving it in water, has the same effect owing to the fact that neither course brings about the respiration required, or at least only to a very small extent. It is necessary that this absorption process for increasing the power of the yeast should be applied only a little while before the dry yeast is intended to be used, as after taking up the moisture the yeast will not keep very long; there would appear to be an inter-molecular respiration owing to the amount of moisture present and this gradually destroys the organisms of the yeast.

What I claim as my invention and desire to secure by Letters Patent is:—

1. The herein described process of increasing the raising power of dried yeast, which consists in subjecting such yeast to the action of aqueous vapor for sufficient time to cause re-hydration of the dried yeast organisms.

2. The herein described process of increasing the raising power of dried yeast, which consists in exposing such yeast to the action of moist air for sufficient time to cause re-hydration of the dried yeast organisms.

3. The herein described process of increasing the raising power of dried yeast, which consists in exposing such yeast in thin layers to the action of moist atmospheric air for sufficient time to cause re-hydration of the dried yeast organisms.

4. The herein described process of increasing the raising power of dried yeast, which consists in exposing such yeast to the action of air artificially saturated with moisture for sufficient time to cause re-hydration of the dried yeast organisms.

5. The herein described process of increasing the raising power of dried yeast, which consists in exposing such yeast in thin layers to the action of air artificially saturated with moisture for sufficient time to cause re-hydration of the dried yeast organisms.

In testimony whereof I have affixed my signature in presence of two witnesses.

PETER DIEDRICH HINRICH OHLHAVER.

Witnesses:
ERNEST H. L. MUMMENHOFF,
IDA CHRIST. HAFERMANN.